(12) United States Patent
Guerrero et al.

(10) Patent No.: US 11,281,953 B2
(45) Date of Patent: Mar. 22, 2022

(54) KEY FOB

(71) Applicant: LEGIC Identsystems AG, Wetzikon (CH)

(72) Inventors: Sebastian Guerrero, Zürich (CH); Rolf Lanz, Baden-Rütihof (CH); Marcel Plüss, Tann (CH); Paul Studerus, Oberweningen (CH)

(73) Assignee: LEGIC Identsystems AG, Wetzikon (CH)

( * ) Notice: Subject to any disclaimer, the term of this patent is extended or adjusted under 35 U.S.C. 154(b) by 0 days.

(21) Appl. No.: 16/577,137

(22) Filed: Sep. 20, 2019

(65) Prior Publication Data

US 2020/0097787 A1  Mar. 26, 2020

(30) Foreign Application Priority Data

Sep. 20, 2018 (CH) .................................. 01131/18

(51) Int. Cl.
*G06K 19/07* (2006.01)
*H04L 9/08* (2006.01)

(52) U.S. Cl.
CPC .......... *G06K 19/0723* (2013.01); *H04L 9/088* (2013.01)

(58) Field of Classification Search
CPC ........................ G06K 19/0723; H04L 9/088

USPC ......................................................... 235/492
See application file for complete search history.

(56) References Cited

U.S. PATENT DOCUMENTS

| 9,842,444 | B2 | 12/2017 | Van Wiemeersch et al. |
| 2005/0225429 | A1 | 10/2005 | Burzio |
| 2014/0218165 | A1 | 8/2014 | Johnson et al. |
| 2014/0266596 | A1* | 9/2014 | Narendra ............ H04L 63/0853 340/5.81 |
| 2017/0095040 | A1* | 4/2017 | Byrd .................... A44B 15/005 |

OTHER PUBLICATIONS

Dec. 31, 2018—(CH) Search Report—U.S. Appl. No. 11/312,018.

* cited by examiner

*Primary Examiner* — Daniel A Hess
(74) *Attorney, Agent, or Firm* — Banner & Witcoff, Ltd.

(57) ABSTRACT

A key fob, comprising an electronic communication circuit, a processor, and a battery configured to power the electronic communication circuit and the processor, further comprises: a communication module for exchanging data with an external electronic communication device, an access control module for exchanging access control data with an external electronic access control device, and a user activatable operating element which activates the communication module, or the access control module, depending on actuation of the operating element by a user.

20 Claims, 2 Drawing Sheets

KEY FOB

CROSS REFERENCE TO RELATED APPLICATIONS

This application claims priority to Swiss Application No. 01131/18, filed Sep. 20, 2018, the entire content of which is incorporated herein by reference in its entirety.

FIELD OF THE INVENTION

The present invention relates to a key fob. Specifically, the present invention relates to a key fob comprising an electronic communication circuit, a processor, and a battery configured to power the electronic communication circuit and the processor.

BACKGROUND OF THE INVENTION

Keyless authentication systems which allow a user to gain access to access controlled locations, vehicles, and computer systems have become widespread. Small handheld key fobs which use passive RFID to transmit data with a reader device are widely used, however their capabilities are limited. They can store a comparatively small amount of data, their data transmissions are short range, and they are inflexible in as far as even passive RFID key fobs which contain rewritable memory require dedicated rewriting devices. Newer generations of key fobs use active transmission technologies, such as active RFID or Bluetooth, to communicate. Though these newer key fobs overcome some of the shortcomings of passive RFID key fobs, they remain inflexible, in as far as they can be used typically only for a single purpose. Updating security credentials in a key fob, or using a single key fob for gaining access to multiple types of systems, remains cumbersome.

SUMMARY OF THE INVENTION

It is an object of this invention to provide a key fob which does not have at least some of the disadvantages of the prior art key fobs.

According to the present invention, these objects are achieved through the features of the independent claims. In addition, further advantageous embodiments follow from the dependent claims.

According to the present invention, the above-mentioned objects are particularly achieved in that a key fob, which comprises an electronic communication circuit, a processor, and a battery configured to power the electronic communication circuit and the processor, further comprises a communication module, an access control module, a user activatable operating element, and a control module. The communication module comprises program code configured to control the processor, such that the processor uses the electronic communication circuit to exchange data with an external electronic communication device. The access control module comprises program code configured to control the processor, such that the processor uses the electronic communication circuit to exchange access control data with an external electronic access control device. The control module comprises program code configured to control the processor, such that the processor activates the communication module, for exchanging data with the external electronic communication device, or the access control module, for exchanging access control data with the external electronic access control device, depending on actuation of the operating element by a user.

In an embodiment, the key fob further comprises a switching element configured to connect and disconnect the battery to and from the processor, depending on the actuation of the operating element by the user.

In another embodiment, the electronic communication circuit is configured to operate switchable in a standby mode or an active mode. The operating element is connected to the electronic communication circuit, and the electronic communication circuit is configured to switch from the standby mode into the active mode, upon actuation of the operating element by the user.

In another embodiment, the key fob further comprises a switching element configured to connect and disconnect the battery to and from the processor. The electronic communication circuit is configured to operate switchable in a standby mode or an active mode. The operating element is connected to the electronic communication circuit. The electronic communication circuit is configured, upon actuation of the operating element by the user, to switch from the standby mode into the active mode and to control the switching element to connect the battery to the processor.

In another embodiment, the control module comprises program code configured to control the processor, such that the processor activates the communication module, for exchanging data with the external electronic communication device, or activates the access control module, for exchanging access control data with the external electronic access control device, depending on a duration of the actuation of the operating element by the user.

In another embodiment, the processor comprises a data store. The control module comprises program code configured to control the processor, such that the processor stores in the data store first data received by the electronic communication circuit from the external electronic communication device, when the communication module is activated. The program code is further configured to control the processor such that the processor transmits the first data from the data store to the external electronic access control device, using the electronic communication circuit when the access control module is activated.

In another embodiment, the control module comprises program code configured to control the processor, such that the processor stores in the data store second data received by the electronic communication circuit from the external electronic access control device, when the access control module is activated. The program code is further configured to control the processor such that the processor then transmits the second data from the data store to the external electronic communication device, using the electronic communication circuit, when the communication module is activated.

In another embodiment, the processor comprises a hardware secure element or the processor is configured as a hardware secure element, and the hardware secure element has stored therein a cryptographic key.

In another embodiment, the hardware secure element has stored therein an encryption module which comprises program code configured to control the processor, such that the processor encrypts data, to be transmitted by the electronic communication circuit, using the cryptographic key.

In another embodiment, the hardware secure element has stored therein a unique chip identifier, and an authentication module which comprises program code configured to control the processor, such that the processor generates an authentication message by encrypting the unique chip identifier using the cryptographic key.

In another embodiment, the hardware secure element has stored therein a customizable module which comprises program code configured to control the processor, such that the processor decrypts a secured data package received by the electronic communication circuit, using the cryptographic key stored in the secure element. The program code is further configured to control the processor such that the processor extracts a replacement cryptographic key from the decrypted secured data package, and replaces the cryptographic key stored in the secure element with the replacement cryptographic key.

In another embodiment, the electronic communication circuit comprises a Bluetooth communication circuit.

In another embodiment, the electronic communications circuit comprises an RFID communication circuit.

In another embodiment, the key fob further comprises a serial interface, e.g. a Serial Peripheral Interface bus (SPI bus), which is configured to interconnect the electronic communication circuit and the processor for data communication.

In another embodiment, the communication module comprises program code configured to control the processor, such that the processor uses the electronic communication circuit to exchange data with an external electronic communication device such as a mobile radio phone, a tablet computer, a laptop computer, a smart watch, and/or another portable computing device configured for communication with the electronic communication circuit of the key fob. The access control module further comprises program code configured to control the processor, such that the processor uses the electronic communication circuit to exchange access control data with an external electronic lock.

In another embodiment, the key fob further comprises a beacon system configured to periodically transmit a beacon message using the electronic communication circuit.

In an embodiment, the beacon system comprises the electronic communication circuit which is further configured to periodically transmit the beacon message.

In an embodiment, the beacon system comprises a beacon module comprising program code configured to control the processor, such that the processor uses the electronic communication circuit to periodically transmit the beacon message.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Whenever possible, like reference numbers will be used to refer to like components or parts.

Figure 1:
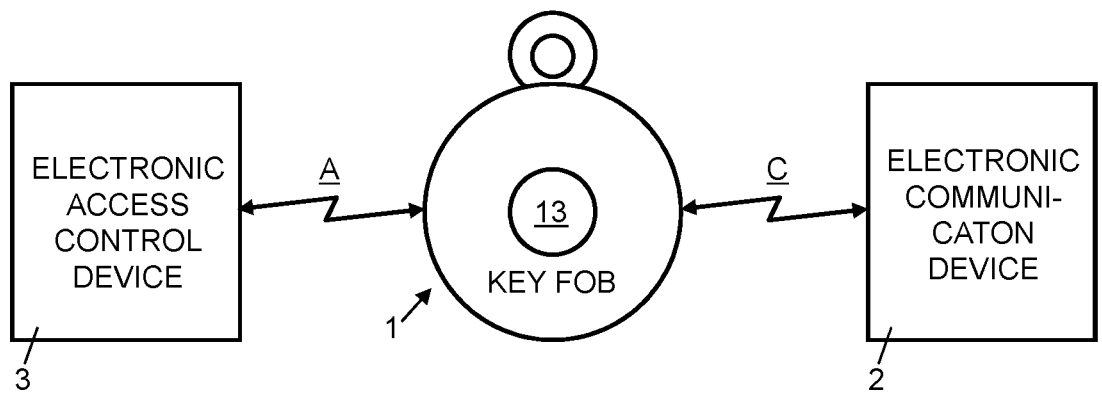
FIG. 1 shows a block diagram illustrating schematically a key fob interacting with an electronic access control device and an electronic communication device.

In FIG. 1, reference numeral 1 refers to a key fob. The key fob 1 is an electronic device used by a user for access control, specifically for gaining access control to physical locations, such as buildings, offices, car-parks, or vehicles, or for gaining access to virtual systems, such as computer systems, network services, and data. The key fob 1 is small enough to comfortable fit in the hand of the user. The key fob 1 is associated with the user who keeps the key fob 1 on their person, such as attached to a keychain in their pockets, or in their possessions, such as in a handbag or a briefcase.

The key fob 1 comprises a user activatable operating element 13. The user activatable operating element 13 has two states. A first state is a default, unactuated state, and a second state is an actuated state. When pressed by the user, the user activatable operating element 13 switches state from the unactuated state to the actuated state. The user activatable operating element 13 remains in the actuated state until it is no longer pressed by the user. Depending on the embodiment, the user activatable operating element 13 comprises a switch, such as an electrical pushbutton switch actuated by a physical force of the user pressing the pushbutton switch, a touch-controlled capacitive switch which operates by measuring a change in capacitance caused by a smaller electrical charge transferring from the user's body to the switch, and/or other types of switches, for example resistive switches which work by lowering a resistance of two conductive components, or piezoelectric switches, which work by generating a small charge in a piezoelectric element to switch on an integrated semiconductor device such as a transistor. A touch-controlled capacitive switch features no moving mechanical components and may be completely sealed off to the environment to avoid moisture and contaminant ingress, resulting in a longer lifespan of the switch and other connected components.

Reference numeral 2 refers to an electronic communication device, such as a mobile radio telephone (cellular phone), a tablet computer, a laptop computer, a smart watch, or another operable portable/mobile electronic device comprising a battery powered electronic circuit, e.g. a programmed processor and/or an application specific integrated circuit (ASIC). The electronic communication device 2 further comprises a wireless transceiver configured for communication with an electronic communication circuit 11 of the key fob 1.

Reference numeral 3 refers to an electronic access control device which is an electronic device, mounted on or in a wall near a doorway, gate, or access control location, or incorporated into a door or gate itself. The electronic access control device 3 further comprises a wireless transceiver. In an embodiment, the electronic access control device 3 is connected to an external electronic lock and configured to control the electronic lock.

Reference character A refers to a wireless transmission between the key fob 1 and the electronic access control device 3, and reference character C refers to a wireless transmission between the key fob 1 and the electronic communication device 2. The wireless transmissions are short-range radio transmissions, more specifically Bluetooth, RFID, WLAN (Wireless Local Area Network), or ultra-wideband transmissions (UWB).

Figure 2:
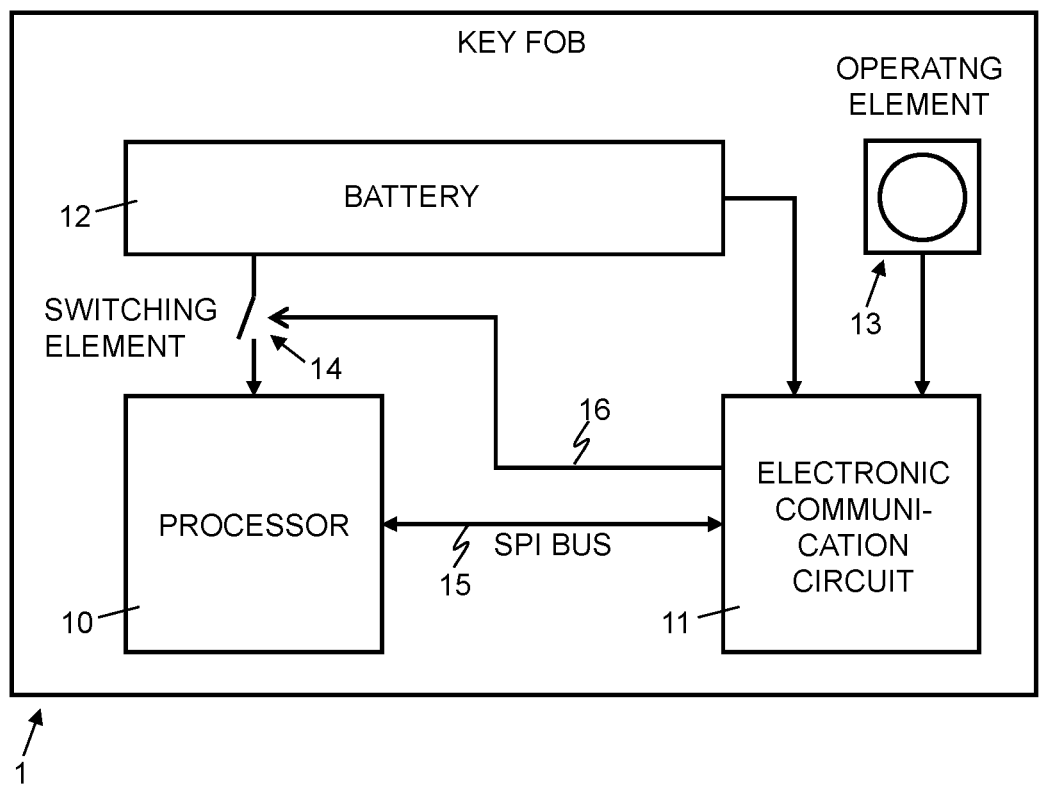
FIG. 2 shows a block diagram illustrating schematically a key fob which comprises a processor, an electronic communication circuit, a battery, and an operating element.

In FIG. 2, reference numeral 11 refers to an electronic communication circuit, more specifically an electronic circuit designed for embedded applications, such as an integrated circuit or a microcontroller, which microcontroller comprises a general purpose processor, memory for storing machine code configured to control the general purpose processor, and application specific integrated circuits for specific tasks such as digital signal processing. The electronic communication circuit 11 comprises a wireless transceiver for transmitting and receiving wireless transmissions such as Bluetooth transmissions or RFID transmissions. The electronic communication circuit 11 is connected to the user activatable operating element 13, by means such as a cable or a conductive track on a printed circuit board. The user may actuate the user activatable operating element 13 for either a short actuation period of a predetermined short press period of time, for example a period less than or equal to 500 milliseconds or 250 milliseconds, a long actuation period of a predetermined long press period of time, for example a period greater than 500 milliseconds or 250 milliseconds, or a very long actuation period of a predetermined very long press period of time, for example a period greater than 3, 5 or 10 seconds. The actuation of the user activatable operating element 13 for the short press period of time is hereafter called a short press. The actuation of the user activatable operating element 13 for the long press period of time is hereafter called a long press. The actuation of the user activatable operating element 13 for the very long press period of time is hereafter called a very long press. The electronic communication circuit 11 determines an actuation period of time that the user activatable operating element 13 is actuated by the user. A short press may be determined after the user releases the user activatable operating element 13, if the duration of the actuation is less than or equal to the predetermined short press period of time. A long press may be determined once the duration of the actuation of the user activatable operating element 13 exceeds the predetermined short period of time. A very long press may be determined once the duration of the actuation of the user activatable operating element 13 exceeds the predetermined long press period of time.

The very long press activates a beacon system. The beacon system comprises the electronic communication circuit 11, which electronic communication circuit 11 periodically transmits a beacon message. Alternatively, the beacon system comprises a beacon module comprising program code configured to control a processor 10, such that the processor 10 uses the electronic communication circuit 11 to periodically transmit the beacon message.

The electronic communication circuit 11 is configured such that it comprises a standby mode, an active mode, and the beacon mode. In the standby mode the electronic communication circuit 11 consumes less electrical energy than in the active mode. The electronic communication circuit 11 is in the standby mode by default. The electronic communication circuit 11 is configured to switch from the standby mode to the active mode by means of a short press or a long press of the user activatable operating element 13. The electronic communication circuit 11 is configured to switch from the active mode to the standby mode by means of short press of the user activatable operating element 13. The electronic communication circuit 11 is configured to switch from the standby mode or the active mode to the beacon mode by means of a very long press of the user activatable operating element 13. In a variant, the key fob 1 comprises a second user activatable operating element, which activates the beacon mode depending on actuation of the second user activatable operating element by the user. In the beacon mode the electronic communication circuit 11 periodically transmits the beacon message, for example once per second, per minute, per 5 minutes, per 15 minutes, per 30 minutes, or per hour. The beacon message is transmitted and received by a receiving device, which may be the electronic access control device 3, the electronic communication device 2, or further electronic devices comprising wireless transceivers or wireless receivers. The receiving device uses the beacon message to raise an alarm. The periodically transmitted beacon messages are used by the receiving device to locate the key fob 1 and the user. The key fob 1 and the user are located using a location of the receiving device, which may be a fixed location if the receiving device is a fixedly installed electronic access control device 3 or similarly fixedly installed receiving device, or a variable location if the receiving device is a mobile electronic communication device 2 or similarly mobile receiving device. The receiving device may also locate the key fob 1 using the transmission properties of the beacon message, which transmission properties may comprise a received signal strength and/or a time of receiving the beacon message. If many receiving devices receive the beacon message, trilateration may be used to more accurately determine the location of the key fob 1. The key fob 1 may be used as part of an iBeacon (Apple) system through the periodic transmission of beacon messages.

The electronic communication circuit 11 is connected to a battery 12, for example a lithium battery, which provides electrical energy for the electronic components of the key fob 1. The electronic communication circuit 11 is connected to a switching element 14 by a connection 16, specifically a cable or conductive track on a printed circuit board. When the electronic communication circuit 11 switches from standby mode to active mode by a short press or long press of the user activatable operating element 13, the switching element 14 connects the battery 12 to the processor 10, powering the processor 10 on. Conversely, when the electronic communication circuit 11 switches from active mode to standby mode, the switching element 14 disconnects the battery 12 from the processor 10, powering the processor 10 off. The switching element 14 may be a transistor or other electronic component which comprises an open and a closed state, the open state allowing little or no electric charge to flow between two points and hence between the battery 12 and the processor 10, and the closed state allowing electric charge to flow, the switching from the open to the closed state dependent on a third point switching from a low voltage to a higher voltage, or upon the third point receiving a signal from the electronic communication circuit 11 to switch from the open to the closed state. Depending on the embodiment, the processor 10 comprises an embedded microprocessor and/or an application specific integrated circuit (ASIC). The processor 10 comprises memory modules, comprising EEPROM and/or flash memory, which comprise program code configured to control the processor 10. The processor 10 is connected to the electronic communication circuit 11 by a serial interface, e.g. a data bus, such as a serial peripheral interface (SPI) bus 15.

Figure 3:
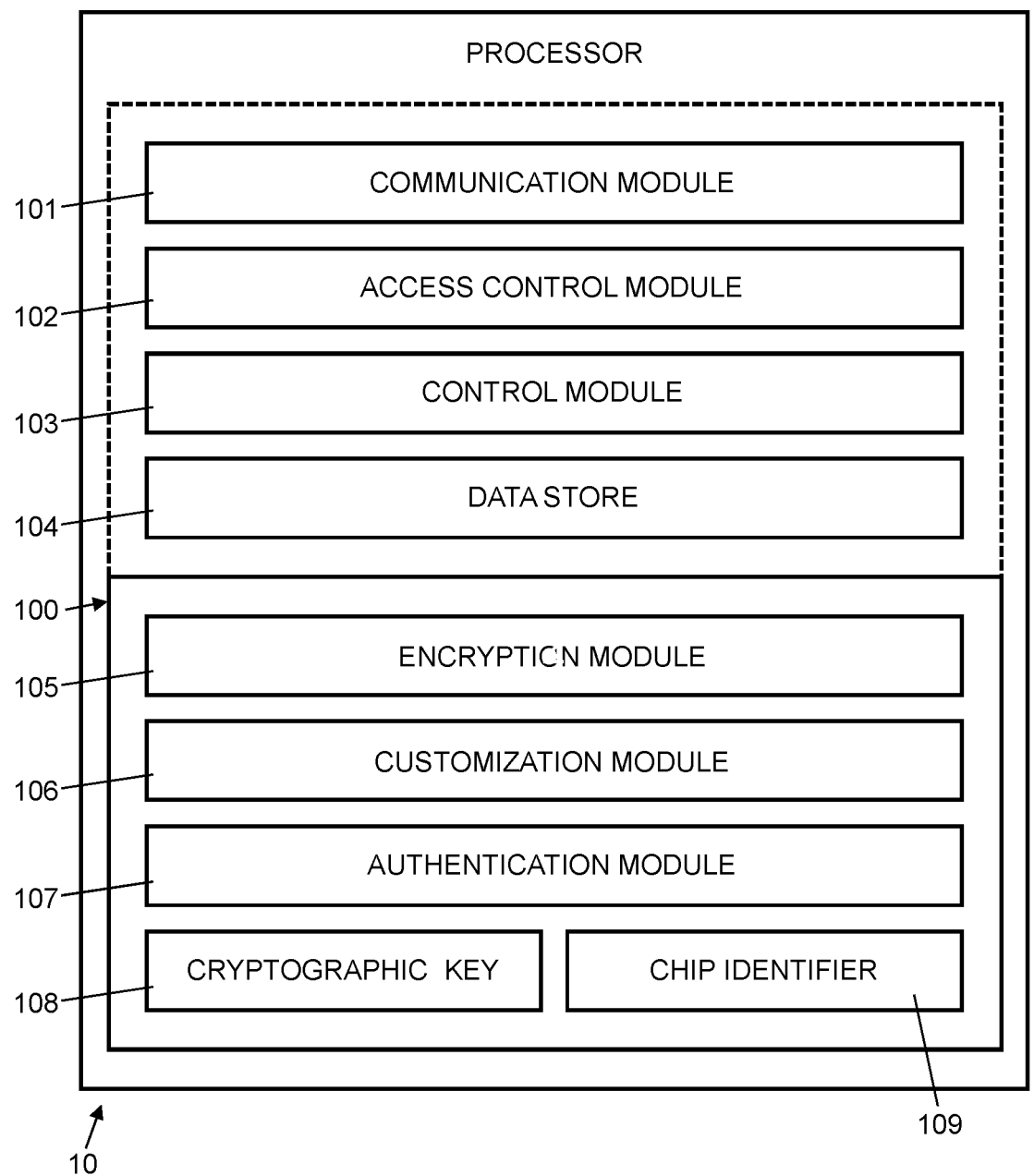
FIG. 3 shows a block diagram illustrating schematically a processor of a key fob, which processor comprises a communication module, an access control module, a control module, a data store, an encryption module, a customization module, an authentication module, a cryptographic key, and a chip identifier.

As illustrated in FIG. 3, the processor 10 of the key fob 1 comprises a plurality of modules, comprising a communication module 101, an access control module 102, a control module 103, and beacon module. These modules enable the key fob 1 to operate in a plurality of modes, comprising a communication mode in which the key fob 1 exchanges data with the electronic communication device 2, an access control mode in which the key fob 1 exchanges data with the electronic access control device 3, and a beacon mode in which the key fob 1 transmits the beacon message for reception by a receiving device. While the key fob 1 is in the communication mode, it exchanges (receive and transmit) data with the electronic communication device 2. While in communication mode, the key fob 1 may also store data received from the electronic communication device 2, such as updated security credentials, access control authorization data, and software updates. The key fob 1 may forward this data to the electronic access control device 3 at a later time in a transmission. While the key fob 1 is in the access control mode it exchanges (transmit and receive) access control data with the electronic access control device 3. While in access control mode, the key fob 1 may store access control data received from the electronic access control device 3, such as access log data comprising an identifier of the electronic access control device 3, timestamps indicating a time the key fob 1 exchanged access control data with the electronic access control device 3, and/or updated access control data. The key fob 1 may forward this data to the electronic communication device 2 at a later time in a transmission. While the key fob 1 is in beacon mode, it periodically transmits the beacon message. The user of the key fob 1 may switch the key fob 1 between the communication mode and the access control mode by actuating the user activatable operating element 13 for a long press period of time. Upon actuating the key fob 1 for a long press period of time, the electronic communication circuit 11 sends a switch signal to the processor 10. The control module 103 is configured to switch the processor 10 from executing program code as comprised in the communication module 101 to executing program code as comprised in the access control module 102. The user of the key fob 1 may switch the key fob 1 between either the communication mode, or the access control mode, to the beacon mode by actuating the user activatable operating element 13 for a very long press period of time. Upon actuating the key fob 1 for the very long press period of time, the electronic communication circuit 11 switches the processor 10 from executing program code as comprised in the communication module 101 or the access control module 103 to executing program code as comprised in the beacon module.

As illustrated in FIG. 3, the communication module 101 of the processor 10 comprises program code configured to control the processor 10, such that the processor 10 uses the electronic communication circuit 11 to exchange (transmit and receive) data with the electronic communication device 2. The data is transmitted and received from the processor 10 via the serial interface 15 and the electronic communication circuit 11 and its wireless transceiver.

The processor 10 comprises an access control module 102, which comprises program code configured to control the processor 10, such that the processor 10 uses the electronic communication circuit 11 to exchange (transmit and receive) access control data with the electronic access control device 3 via the serial interface 15 and the electronic communication circuit 11 and its wireless transceiver.

The processor 10 comprises a beacon module, which comprises program code configured to control the processor 10, such that the processor 10 uses the electronic communication circuit 11 to periodically transmit the beacon message with the receiving device via the serial interface 15 and the electronic communication circuit 11 and its wireless transceiver.

The processor 10 comprises a control module 103, which comprises program code configured to control the processor 10, such that the processor 10 switches between using the communication module 101, the access control module 102, and the beacon module. Only one of the communication module 101, the access control module 102, and the beacon module are active at any given time. If the communication module 101 is currently inactive and the access control module 102 is currently active, then the control module 103 activates the communication module 101, and deactivates the access control module 102, upon the user actuating the user activatable operating element 13 for a long press period of time. Conversely, if the communication module 101 is currently active and the access control module 102 is currently inactive, then the control module 103 deactivates the communication module 101, and activates the access control module 102, upon the user actuating the user activatable operating element 13 for a long press period of time. If either the communication module 101 or the access control module 102 is currently active, then the control module 103 deactivates the communication module 101 or the access control module 102, respectively, and activates the beacon module, upon the user actuating the user activatable operating element 13 for a very long press period of time.

The control module 103 comprises program code configured to control the processor 10, such that the processor 10 stores in a data store 104 first data received by the electronic communication circuit 11 from the electronic communication device 2, when the communication module 101 is active. The first data may comprise access control data, for granting the user access at an access control point. When the access control module 102 is active, the first data stored in the data store 104 is transmitted by the processor 10 to the electronic access control device 3 using the electronic communication circuit 11, as appropriate by the respective application and/or configuration.

The control module 103 comprises program code configured to control the processor 10, such that the processor 10 stores in a data store 104 second data received by the electronic communication circuit 11 from the electronic communication device 2, when the access control module 102 is active. When the communication module 101 is activated, the second data stored in the data store 104 is transmitted by the processor 10 to the electronic communication device 2 using the electronic communication circuit 11, as appropriate by the respective application and/or configuration.

The data store 104 is connected to, or integrated into, the processor 10. The data store 104, more specifically a volatile or non-volatile memory module, such as electrically erasable programmable read-only memory (EEPROM), random-access memory (RAM), Flash memory, or another storage medium which can be read, electrically erased and reprogrammed.

The processor 10 either comprises a hardware secure element 100, or the processor is configured as a hardware secure element 100. The hardware secure element 100 is a tamper resistant hardware module, capable of storing data which must be kept strictly confidential and private. The hardware secure element 100 provides both physical and logical protection of data, and may be responsive to tampering by deleting stored data or otherwise rendering the hardware secure element 100 inoperable. The hardware secure element 100 has stored therein a cryptographic key 108. The hardware secure element 100 also has stored therein an encryption module 105, which comprises program code configured to control the processor 10, such that the processor 10 encrypts data, to be transmitted by the electronic communication circuit 11 in an encrypted transmission, using the cryptographic key 108. The electronic access control device 3 and the electronic communication device 2 contain corresponding encryption keys for decrypting the encrypted data. By encrypting the data transmission, security is ensured, such that eavesdropping parties cannot glean any useful data from the data transmission for later spoofing attacks. The hardware secure element 100 has stored therein a unique chip identifier 109, and an authentication module 107, which comprises program code configured to control the processor 10, such that the processor 10 generates an authentication message by encrypting the unique chip identifier 109 using the cryptographic key 108. The authentication message is transmitted by the processor 10 to the recipient, which is either the electronic access control device 3 or the electronic communication device 2, using the electronic communication circuit 11, depending on whether the access control module 103 or the communication module 101, respectively, is currently active. The authentication message is decrypted by the recipient using the corresponding cryptographic key 108. The decrypted authentication message is used by the recipient to verify whether the unique chip identifier 109 is valid.

The hardware secure element 100 has stored therein a customization module 106, which comprises program code configured to control the processor 10, such that the processor 10 decrypts a secured data package received by the electronic communication circuit 11, using the cryptographic key 108 stored in the hardware secure element 100. The secured data package is transmitted to the electronic communication circuit 11 by either the access control device 3 or the electronic communication device 2. The processor 10 extracts a replacement cryptographic key from the decrypted secured data package, and replaces the cryptographic key 108 stored in the hardware secure element 100 with the replacement cryptographic key.

We claim:

1. A key fob comprising:
an electronic communication circuit;
a processor configured as, or comprising, a hardware secure element, the hardware secure element having stored therein a cryptographic key and a unique chip identifier;
a battery configured to power the electronic communication circuit and the processor;
an authentication module arranged in the hardware secure element and comprising program code configured to control the processor, such that the processor generates an authentication message by encrypting the unique chip identifier using the cryptographic key;
a communication module comprising program code configured to control the processor, such that the processor uses the electronic communication circuit to transmit the authentication message to, and to exchange data with, an external electronic communication device;
an access control module comprising program code configured to control the processor, such that the processor uses the electronic communication circuit to transmit the authentication message to, and to exchange access control data with, an external electronic access control device;
a user activatable operating element; and
a control module comprising program code configured to control the processor, such that the processor activates the communication module, for exchanging data with the external electronic communication device, or the access control module, for exchanging access control data with the external electronic access control device, depending on actuation of the operating element by a user.

2. The key fob of claim 1, wherein the key fob further comprises a switching element configured to connect and disconnect the battery to and from the processor, depending on the actuation of the operating element by the user.

3. The key fob of claim 1, wherein the key fob further comprises a switching element configured to connect and disconnect the battery to and from the processor, wherein the electronic communication circuit is configured to operate switchable in one of: a standby mode and an active mode, wherein the operating element is connected to the electronic communication circuit, and wherein the electronic communication circuit is configured, upon actuation of the operating element by the user, to switch from the standby mode into the active mode and to control the switching element to connect the battery to the processor.

4. The key fob of claim 1, wherein the processor comprises a data store, wherein the control module comprises program code configured to control the processor, such that the processor stores in the data store first data received by the electronic communication circuit from the external electronic communication device, when the communication module is activated, and transmits the first data from the data store to the external electronic access control device, using the electronic communication circuit, when the access control module is activated.

5. The key fob of claim 4, wherein the processor comprises a data store, wherein the control module comprises program code configured to control the processor, such that the processor stores in the data store second data received by the electronic communication circuit from the external electronic access control device, when the access control module is activated, and transmits the second data from the data store to the external electronic communication device, using the electronic communication circuit, when the communication module is activated.

6. The key fob of claim 1, wherein the electronic communication circuit comprises a Bluetooth communication circuit.

7. The key fob of claim 1, wherein the electronic communication circuit comprises an RFID communication circuit.

8. The key fob of claim 1, further comprising a serial interface configured to interconnect the electronic communication circuit and the processor for data communication.

9. The key fob of claim 1, wherein the communication module comprises program code configured to control the processor, such that the processor uses the electronic communication circuit to exchange data with at least one of: an external mobile radio phone, a tablet computer, a laptop computer, a smart watch, or another portable computing device configured for communication with the electronic communication circuit of the key fob, wherein the access control module comprises program code configured to control the processor, such that the processor uses the electronic communication circuit to exchange access control data with an external electronic lock.

10. The key fob of claim 1, wherein the user activatable operating element is a single electrical pushbutton switch.

11. A key fob comprising:
an electronic communication circuit;
a processor configured as, or comprising, a hardware secure element, the hardware secure element having stored therein a cryptographic key and a unique chip identifier;
a battery configured to power the electronic communication circuit and the processor;
an authentication module arranged in the hardware secure element and comprising program code configured to control the processor, such that the processor generates an authentication message by encrypting the unique chip identifier using the cryptographic key;
a communication module comprising program code configured to control the processor, such that the processor uses the electronic communication circuit to transmit the authentication message to, and to exchange data with, an external electronic communication device;

an access control module comprising program code configured to control the processor, such that the processor uses the electronic communication circuit to transmit the authentication message to, and to exchange access control data with, an external electronic access control device;

a beacon system configured to periodically transmit a beacon message using the electronic communication circuit;

a user activatable operating element; and a control module comprising program code configured to control the processor, such that the processor activates the communication module, for exchanging data with the external electronic communication device, or the access control module, for exchanging access control data with the external electronic access control device, depending on actuation of the operating element by a user.

12. The key fob of claim 11, wherein the key fob further comprises a switching element configured to connect and disconnect the battery to and from the processor, depending on the actuation of the operating element by the user.

13. The key fob of claim 11, wherein the key fob further comprises a switching element configured to connect and disconnect the battery to and from the processor, wherein the electronic communication circuit is configured to operate switchable in one of: a standby mode and an active mode, wherein the operating element is connected to the electronic communication circuit, and wherein the electronic communication circuit is configured, upon actuation of the operating element by the user, to switch from the standby mode into the active mode and to control the switching element to connect the battery to the processor.

14. The key fob of claim 11, wherein the processor comprises a data store, wherein the control module comprises program code configured to control the processor, such that the processor stores in the data store first data received by the electronic communication circuit from the external electronic communication device, when the communication module is activated, and transmits the first data from the data store to the external electronic access control device, using the electronic communication circuit, when the access control module is activated.

15. The key fob of claim 14, wherein the processor comprises a data store, wherein the control module comprises program code configured to control the processor, such that the processor stores in the data store second data received by the electronic communication circuit from the external electronic access control device, when the access control module is activated, and transmits the second data from the data store to the external electronic communication device, using the electronic communication circuit, when the communication module is activated.

16. The key fob of claim 11, wherein the electronic communication circuit comprises a Bluetooth communication circuit.

17. The key fob of claim 11, wherein the electronic communication circuit comprises an RFID communication circuit.

18. The key fob of claim 11, further comprising a serial interface configured to interconnect the electronic communication circuit and the processor for data communication.

19. The key fob of claim 11, wherein the communication module comprises program code configured to control the processor, such that the processor uses the electronic communication circuit to exchange data with at least one of: an external mobile radio phone, a tablet computer, a laptop computer, a smart watch, or another portable computing device configured for communication with the electronic communication circuit of the key fob, wherein the access control module comprises program code configured to control the processor, such that the processor uses the electronic communication circuit to exchange access control data with an external electronic lock.

20. The key fob of claim 11, wherein the user activatable operating element is a single electrical pushbutton switch.

* * * * *